United States Patent [19]
O'Brien

[11] Patent Number: 5,822,629
[45] Date of Patent: Oct. 13, 1998

[54] ELECTRONICALLY CONTROLLED VARIABLE SLIT WIDTH FOCAL PLANE SHUTTER

[75] Inventor: Michael J. O'Brien, Rochester, N.Y.

[73] Assignee: Eastman Kodak Company, Rochester, N.Y.

[21] Appl. No.: 961,441

[22] Filed: Oct. 30, 1997

[51] Int. Cl.⁶ .................................................. G03B 7/093
[52] U.S. Cl. .......................................... 396/235; 396/246
[58] Field of Search ..................................... 396/235, 246, 396/489, 497; 352/214, 216, 218

[56] References Cited

U.S. PATENT DOCUMENTS

| | | | |
|---|---|---|---|
| 2,949,834 | 8/1960 | Doyle et al. | 396/246 |
| 3,116,670 | 1/1964 | Ball | 396/246 |
| 3,124,049 | 3/1964 | Ball | 396/235 |
| 4,033,693 | 7/1977 | Payrhammer et al. . | |
| 4,839,679 | 6/1989 | Cameron et al. . | |
| 5,576,830 | 11/1996 | O'Brien et al. . | |
| 5,614,978 | 3/1997 | Kanzaki . | |

Primary Examiner—W. B. Perkey
Attorney, Agent, or Firm—Thomas H. Close

[57] ABSTRACT

A focal plane shutter includes first and second shutter blades mounted for forming a slit that is scanned across an aperture. The shutter blades are shaped to form the slit between a trailing edge of the first blade and a leading edge of the second blade, the width of the slit being determined by the relative position of the first and second blades with respect to each other. The velocity of the slit across the aperture is determined by the velocity of the two blades. A pair of moving coil actuators are connected to the blades, for moving the blades relative to the aperture, and a pair of position sensors are connected, one to each shutter blade, for producing signals indicating the positions of the shutter blades relative to the aperture. A shutter controller electrically connected to the moving coil actuators and the position sensors is responsive to the signals from the position sensors for applying power to drive the actuators to control the width of the slit formed by the shutter blades and the rate of movement of the slit across the aperture. The controller includes a velocity controller for the first blade to control the velocity of the slit across the aperture, and a position controller for controlling the position of the second blade relative to the first blade to maintain a constant slit width as the slit is moved relative to the aperture.

8 Claims, 3 Drawing Sheets

ELECTRONICALLY CONTROLLED VARIABLE SLIT WIDTH FOCAL PLANE SHUTTER

CROSS-REFERENCE TO RELATED APPLICATIONS

Reference is made to commonly assigned co-pending application U.S. Ser. No. 08/639,064, entitled Device for Controlling an Amount of Light Allowed to Reach a Photosensitive Surface, filed in the name of O'Brien et al. on Apr. 24, 1996, allowed May 14, 1997.

FIELD OF THE INVENTION

The present invention relates to high speed electromagnetic actuators employing closed loop control. It more specifically relates to variable slit width focal plane shutters comprised of two electromagnetically driven shutter blades.

BACKGROUND OF THE INVENTION

Current high quality single lens reflex type cameras employ focal plane shutters. This type of shutter allows lenses to be changed without exposing the film and has a wide range of shutter speeds. Typical focal plane shutters consist of two curtains which travel across the film plane at a fixed speed. The second curtain is released at a specified time after the first, producing a slit which moves across the film plane, exposing the film. Varying the release time of the second curtain varies the effective shutter speed and hence exposure. Most current focal plane shutters found in 35 mm film and electronic cameras employing area array image sensors are mechanical devices which do not lend themselves to electronic control. Stepper motors and electromagnetic actuators have replaced drive springs on some designs in an attempt to provide electronic control of a conventional focal plane shutter. See, for example, U.S. Pat. No. 5,614,978, issued Mar. 25, 1997, to Kazaki which shows a shutter having a pair of curtains, each having a plurality of leaves that are driven by four bar linkages. These sliding curtain or panel type shutter mechanisms have limited speed capability due to their high inertia.

A shutter described in U.S. Pat. No. 4,033,693, issued Jul. 5, 1977, to Payrhammer et al. employs an open loop control to move a pair of rotatably mounted shutter blades, using a detector at the end of travel to signal the completion of the motion. A similar shutter blade arrangement is seen in U.S. Pat. No. 4,839,679, issued 1989, to Cameron et al., where the drive pulls are optimized to the dynamics of the blades to minimize shock and vibration during operation. Neither of these shutters allow for forming a traveling slit.

There is a need therefore for an improved slit type shutter with accurate slit width control throughout its travel that is independent of the blade speed. This would allow very high effective shutter speed with even exposure over the entire film or image sensor area.

It is an object of the present invention to provide a highly repeatable and accurate slit type focal plane shutter capable of equivalent shutter speeds less than $1/8000$ of a second. It is another objective of the present invention to provide a shutter that is controlled electronically.

SUMMARY OF THE INVENTION

A focal plane shutter includes first and second shutter blades mounted for forming a slit that is scanned across an aperture. The shutter blades are shaped to form the slit between a trailing edge of the first blade and a leading edge of the second blade, the width of the slit being determined by the relative position of the first and second blades with respect to each other. The velocity of the slit across the aperture is determined by the velocity of the two blades. A pair of moving coil actuators are connected to the blades, for moving the blades relative to the aperture, and a pair of position sensors are connected, one to each shutter blade, for producing signals indicating the positions of the shutter blades relative to the aperture. A shutter controller electrically connected to the moving coil actuators and the position sensors is responsive to the signals from the position sensors for applying power to drive the actuators to control the width of the slit formed by the shutter blades and the rate of movement of the slit across the aperture. The controller includes a velocity controller for the first blade to control the velocity of the slit across the aperture, and a position controller for controlling the position of the second blade relative to the first blade to maintain a constant slit width as the slit is moved relative to the aperture. In a preferred embodiment, the blades are rotatably mounted on the shutter.

ADVANTAGES OVER PRIOR ART

The current invention has the following advantages over the prior art:

1. Effective shutter speed is electronically controlled by controlling the relative positions of the two shutter blades.
2. Very precise control of slit width provides even exposure over the entire film or image sensor area.
3. Extremely accurate exposure can be achieved by using velocity control on the blades.
4. The first blade can be driven open loop with an optimized drive pulse for non critical application.

DETAILED DESCRIPTION OF THE INVENTION

Figure 1:
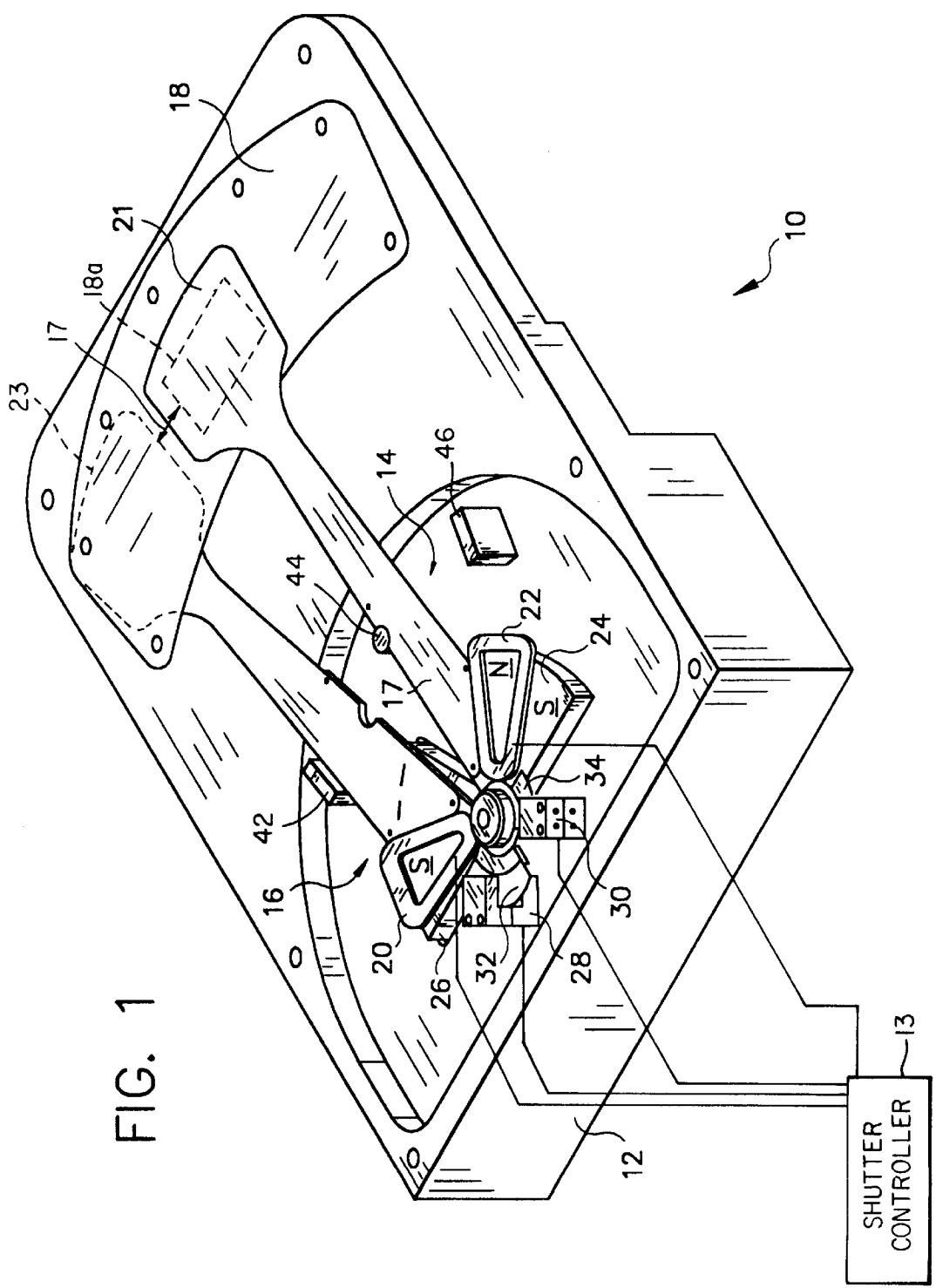
FIG. 1 is a perspective view of a focal plane shutter according to the present invention.

A view of a focal plane shutter mechanism 10 according to the present invention is illustrated in FIG. 1. A cover for the mechanism has been removed to facilitate viewing. The entire shutter mechanism is built on a base 12 to insure proper alignment and ease of assembly. The shutter mechanism includes two blade assemblies 14, 16 each having a respective shutter blade (movable light regulating member) 21, 23. The shutter blades are moved clockwise simultaneously, the first blade 21 leading the second blade 23, by a predetermined distance to form a slit 17 defined by the trailing edge of the first blade 21 and the leading edge of the second blade 23. The slit 17 is swept past an aperture 18a in a blade separator 18 for passing light towards a photosensitive surface of a light recording member (not shown) to record an image on the photosensitive surface of the light recording member. The photosensitive surface can be, for example, a silver-halide film or a two dimensional array solid state image sensor such as a Charge-Coupled Device (CCD). Separator 18 prevents the edges of blades 21, and 23 from hooking or colliding with each other during movement of the blades.

Electrically conductive actuator coils 20, 22 are mounted to move with their respective blade assembly. Two asymmetric magnet assemblies 24, 26 are located in pockets provided in base 12. These magnet assemblies, in combination with two more magnet assemblies in a cover (not shown), provide a magnetic field which causes a respective blade assembly to move in a first direction when electrical current is passed through a coil on that blade assembly. For example, blade 21 is shown in a home position in FIG. 1. The blade is held in this position by continuously running a small amount of current (e.g. 15 milliamps) through coil 22. The current is supplied by shutter controller 13. Coil 22 is located over a first magnet of assembly 24 which has a north pole adjacent the coil. When the holding current in the coil is reversed and increased, the blade assembly is rapidly rotated clockwise until coil 22 is adjacent a second magnet of assembly 24 which has a south pole adjacent coil 22. When the direction of the current is again reversed, the blade assembly moves in a counterclockwise direction back to its home position. Coils 20, 22 do not overlap with each other during their movement, thereby greatly reducing electromagnetic interference between the two coils. The electrical current flowing in each coil can be individually controlled such that movement of each blade 21, 23 is individually controllable. Such an arrangement will be called a moving coil rotary actuator.

Two optical sensors 28, 30 for providing blade position feedback are also mounted on the base 12. Each sensor includes a radiation emitter (e.g. a light emitting diode (LED)) and a radiation detector (e.g. a photodiode) for sensing radiation from the emitter. The radiation is transmitted through an optical gradient density wedge, respectively 32, 34, mounted to move with its respective blade assembly. Each wedge includes a printed linear density gradient and will transmit an amount of radiation which depends on where the radiation is incident on the wedge. The precise position of each blade assembly can be determined from the electrical output of its associated radiation detector. Such an arrangement is disclosed in the above-mentioned cross-referenced patent application which is incorporated herein by reference.

Coils 20, 22 are formed as follows. A copper wire covered with an inner and outer layer of plastic insulation is wrapped multiple times around a form. The outer plastic layer has a lower melting temperature than the inner plastic layer. The wrapped copper wire is then heated to a temperature sufficient to soften the outer plastic layer without substantially softening the inner plastic layer. Next, the wrapped, heated copper wire is cooled, causing the softened outer layers of the copper wire wraps to fuse together, thereby forming a uniform structure.

Epoxy is used to bond the bobbinless self supported actuator coils onto the blades 21 and 23. Coils 20, 22 also add mechanical strength to their respective blade assembly. Each gradient wedge 32, 34 is glued to its respective shutter blade. Other functional features such as a triad of blade stops 42, 44, 46 are built into the base. Blade stop 44 is a centrally located single pin which serves as blade 23 maximum travel stop as well as blade 21 home position stop. Stop 42 is a home position stop for blade 23 while stop 46 is a maximum travel stop for blade 21.

Sets of tangential grooves (not shown) are machined into the base where blade 23 contacts the surface of the base to prevent blade 23 from sticking to the base due to air pressure difference as it traverse the aperture at high velocities. A similar set of grooves is provided on the cover (not shown) to facilitate movement of blade 21. The limiting aperture of the shutter mechanism is provided by aperture 18a in separator 18.

Figure 2:
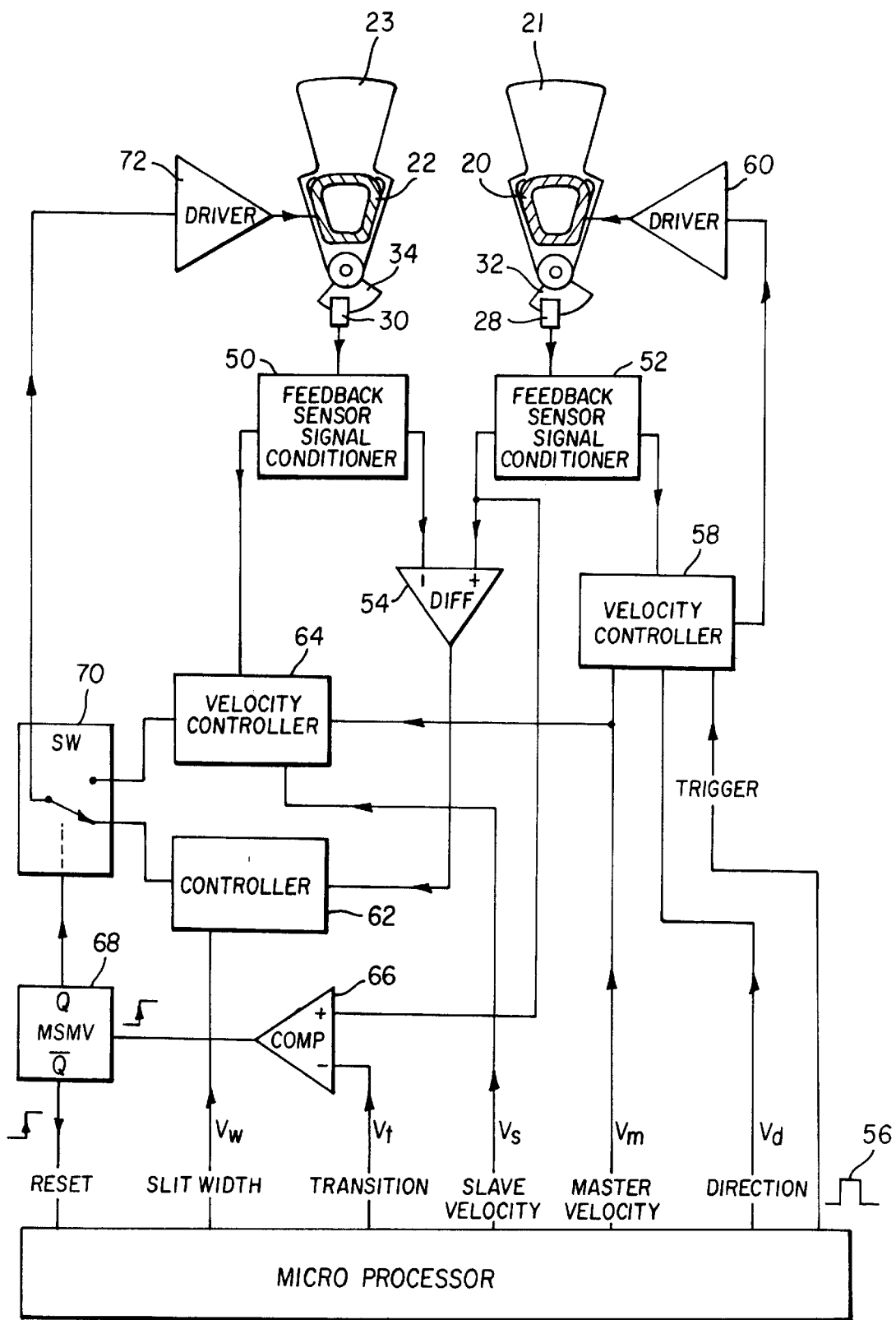
FIG. 2 is a schematic block diagram of the focal plane shutter shown in FIG. 1.

A block diagram of the shutter controller 13 is illustrated in FIG. 2. The shutter controller 13 includes a main microprocessor 15 that receives shutter control inputs, such as exposure value and shutter release signals and controls the operation of the other elements of the shutter controller.

Basic shutter elements consisting of the shutter blades 21 and 23, drive coils 20 and 22, optical sensors 28 and 30, and optical gradient masks 32 and 34 are shown schematically. It should be appreciated that alternative sensors, such as magnetic Hall effect sensors, current feedback from the coils, a tachometer, digital encoder etc. may be employed to sense the positions of the shutter blades according to the present invention. The optical system was chosen for its low inertia, high bandwidth and inherent linearity. Feedback signal conditioner circuits 50 and 52 convert each raw sensor current into two voltage signals proportional to blade displacement and velocity. A difference signal which is proportional to the slit width is derived by subtracting the second blade position signal from the first blade position signal with difference amplifier 54. During operation, a drive signal 56 triggers the first blade velocity controller 58, which through the high current driver 60, moves the first blade 21 to the right, uncovering a portion of the aperture. Blade velocity and direction is set by applying DC voltages $V_m$ and $V_d=0$ (Low) respectively to the first blade velocity controller 58. A slit width controller 62 maintains the relative position of second blade 23 with respect to first blade 21 based on the feedback signal from the difference amp 54 and the DC slit width control input signal $V_w$. Slit width control voltage that is produced by slit width controller 62 is scaled such that it is equal to the output of the difference amplifier 54 when the gap between the blades equals the desired slit width. This slit width controller 62 is a basic Proportional Integral Derivative (PID) controller with sufficient bandwidth to handle the response times needed for specific shutter application. Second blade velocity controller 64 derives its feedback signal from signal conditioner 50, but is inactive until the first blade 21 reaches its right most position. Velocity control voltage $V_s$ is equal to the $V_m$ during the exposure cycle. Comparator 66 monitors the position of the first blade 21 and compares it to $V_t$ which equals the voltage corresponding to the position output when the first blade is in its right most position. Monostable multivibrator 68 is tripped by the rising edge of the output of comparator 66 to activate switch 70, changing from position to velocity control of the second blade 23. Output from switch 70 feeds driver 72 to move the second blade under either position or velocity control.

Figure 3:
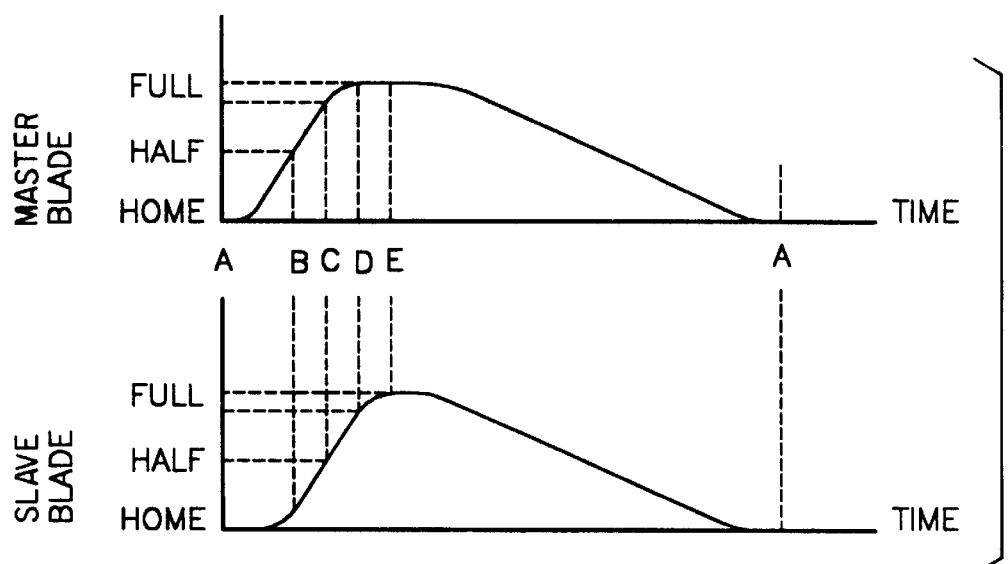
FIG. 3 shows a pair of plots illustrating the motions of the first and second shutter blades in the focal plane shutter.
Figure 4:
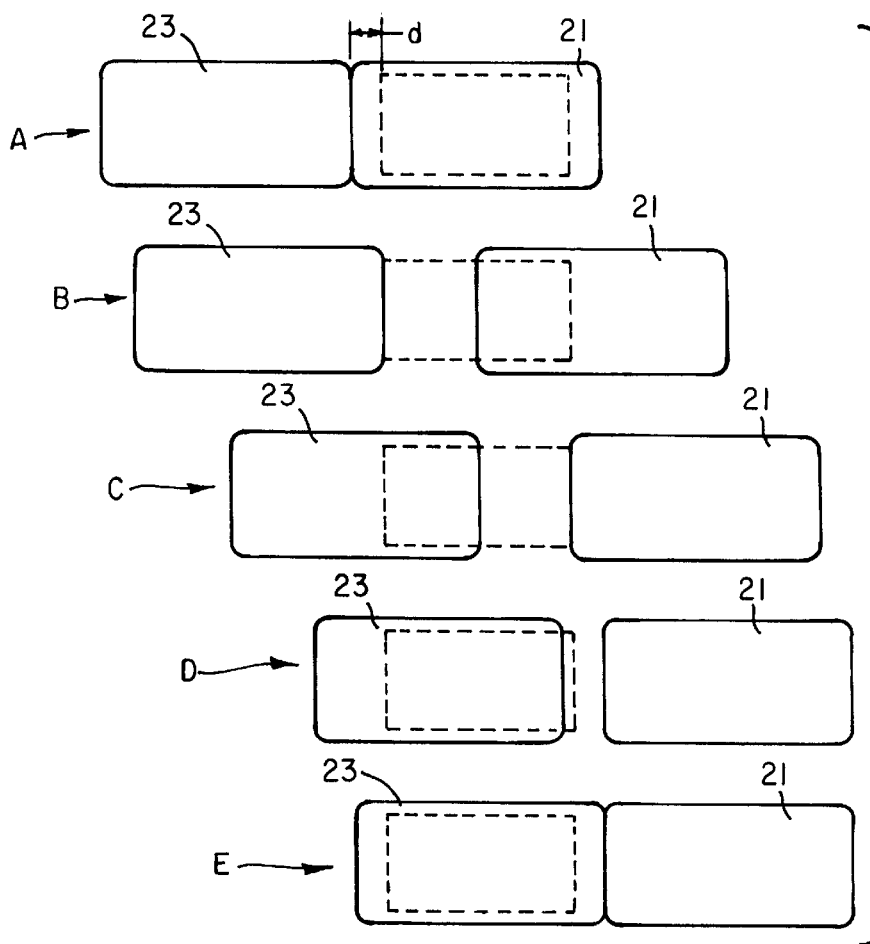
FIG. 4 is a schematic diagram blade positions relative to the aperture in the focal plane shutter.

A typical exposure cycle is illustrated in FIGS. 3 and 4. The letters A–E designating the different times in the shutter activation sequence in FIG. 3 correspond to the positions of the shutter blades 21 and 23 shown in FIG. 4. The sequence begins at A where both blades are held in the home position by small negative coil current (5 ma to 15 ma). At the rising edge of a trigger signal at time A, a large positive current (1 amp) is supplied to first blade 21. It is assumed for this example that the slit width is equal to half the aperture plus distance d, however, any slit width from none to the full aperture width may be set by adjusting $V_w$ between zero and its maximum value. Note that the blade position is such that the blades may accelerate to maximum velocity before the aperture is uncovered, thereby easing the transient response requirements on the position controller driving the second blade. Once first blade 21 reaches its half aperture point at B, the slit width controller 62 moves the second blade 23 to maintain its position relative to the first blade 21. A lead-in portion allows the second blade to accelerate and settle before it begins to close the aperture. The slit continues traversing the aperture at C, until the master blade reaches its right most home position against a stop at D. At this point the slit width control is switched over to velocity control which forces the second blade to close and cover the remaining portion of the aperture with the same velocity as the first blade at E. Once both blades have reached their right most position, they are brought back to their original left most positions at A, while covering the aperture. This is accomplished by making $V_d$=5V (High) to reverse direction and making $V_m$ about 10% less than $V_s$ to insure that the aperture is never open during the blade return phase. All system voltages are reset to the original values once both blades have returned to their left most position. Monostable multivibrator 68 remains high (engaging velocity control) until the end of the blade return phase. Its Q-not outputs rising edge triggers the microprocessor to reset the control voltages. This arrangement minimizes the computational load on the main microprocessor 15.

The invention has been described in detail with particular reference to certain preferred embodiments thereof, but it will be understood that variations and modifications can be effected within the spirit and scope of the invention. For example, although the slit width and velocity controllers have been described as being separate analog components, it will be appreciated that they can be digitally implemented in the microprocessor 15. Also, although the velocity controller for the first blade 21 was described as a closed loop controller, the first blade can be driven open loop with an optimized drive pulse for non critical application. Furthermore, although the invention has been described with respect to a pivotally mounted shutter blade, it could be employed in a multi-sliding blade shutter mechanism of the type disclosed in U.S. Pat. No. 5,614,978 issued Mar. 25, 1997 to Kazaki by attaching the sensors directly to the edges of the blades that define the slit.

PARTS LIST 10 shutter mechanism
12 base plate
13 shutter controller
14 blade assembly
15 microprocessor
16 blade assembly
17 slit
18 blade spacer
18a aperture
20 drive coil
21 slave blade
22 drive coil
23 master blade
24 magnet assembly
26 magnet assembly
28 optical sensor
30 optical sensor
32 gradient wedge
34 gradient wedge
42 stop
44 stop
46 stop
50 feedback signal conditioner circuit
52 feedback signal conditioner circuit
54 difference amplifier
56 drive signal
58 first blade velocity controller
60 high current driver
62 slit width controller
64 second blade velocity controller
66 comparator
68 monostable multivibrator
70 switch
72 driver

What is claimed is:

1. A focal plane shutter, comprising:

first and second shutter blades, rotatably mounted for forming a slit that is scanned across an aperture, the shutter blades being shaped to form the slit between a trailing edge of the first blade and a leading edge of the second blade, the width of the slit being determined by the relative position of the first and second blades with respect to each other, and the velocity of the slit across the aperture being determined by the angular velocity of the two blades;

a pair of moving coil actuators respectively connected to the blades, for moving the blades relative to the aperture;

a pair of position sensors respectively connected to each shutter blade for producing signals indicating the positions of the shutter blades relative to the aperture; and a shutter controller electrically connected to the moving coil actuators and the position sensors, the controller being responsive to the signals from the position sensors for applying power to drive the actuators to control the width of the slit formed by the shutter blades and the rate of movement of the slit across the aperture, the controller including:

a velocity controller for the first blade to control the velocity of the slit across the aperture, and a position controller for controlling the position of the second blade relative to the first blade to maintain a constant slit width.

2. The focal plane shutter claimed in claim 1, wherein the shutter controller further comprises: a velocity controller for controlling the velocity of the second blade after the first blade has stopped at the end of its travel across the aperture.

3. The focal plane shutter claimed in claim 2, wherein the shutter controller further comprises: a comparator for determining the end of travel of the first blade and switching from the position controller to the velocity controller for the second blade.

4. The focal plane shutter claimed in claim 1, wherein the velocity controller for the first blade is an open loop controller.

5. The focal plane shutter claimed in claim 1, wherein the velocity controller for the first blade is a closed loop controller employing the position signal from the position sensor connected to the first blade.

6. The focal plane shutter claimed in claim 1, wherein the moving coils and position sensors are attached directly to the respective shutter blades.

7. A focal plane shutter, comprising:

first and second shutter blades, mounted for forming a slit that is scanned across an aperture, the shutter blades forming the slit between a trailing edge of the first blade and a leading edge of the second blade, the width of the slit being determined by the relative position of the first and second blades with respect to each other, and the velocity of the slit across the aperture being determined by the velocity of the two blades;

a pair of actuators respectively connected to the blades, for moving the blades relative to the aperture;

a pair of position sensors respectively connected to each shutter blade for producing signals indicating the positions of the shutter blades relative to the aperture; and a shutter controller electrically connected to the actuators and the position sensors, the controller being responsive to the signals from the position sensors for applying power to drive the actuators to control the width of the slit formed by the shutter blades and the rate of movement of the slit across the aperture, the controller including:

a velocity controller for the first blade to control the velocity of the slit across the aperture, and a position controller for controlling the position of the second blade relative to the first blade to maintain a constant slit width.

8. The focal plane shutter claimed in claim 7, wherein the blades are rotatably mounted.

* * * * *